United States Patent [19]

Kashiwazaki et al.

[11] Patent Number: 5,661,511
[45] Date of Patent: Aug. 26, 1997

[54] INK-JET PRINTING METHOD AND METHOD OF PRODUCING PRINT

[75] Inventors: Akio Kashiwazaki, Yokohama; Katsuhiro Shirota, Inagi; Masato Katayama, Yokohama; Kenichi Moriya, Tokyo, all of Japan

[73] Assignee: Canon Kabushiki Kaisha, Tokyo, Japan

[21] Appl. No.: 327,801

[22] Filed: Oct. 24, 1994

[30] Foreign Application Priority Data

Oct. 27, 1993 [JP] Japan ................................. 5-269013

[51] Int. Cl.$^6$ ................................ B41J 2/205; B41J 2/215
[52] U.S. Cl. ................ 347/100; 347/105; 106/31.36; 106/31.38; 106/31.39; 106/31.54; 106/31.55
[58] Field of Search ................................ 347/100, 105; 106/20 D

[56] References Cited

U.S. PATENT DOCUMENTS

| | | | |
|---|---|---|---|
| 5,220,347 | 6/1993 | Fukushima et al. | 347/100 |
| 5,270,103 | 12/1993 | Oliver et al. | 347/105 |
| 5,409,529 | 4/1995 | Nagashima et al. | 347/100 |

FOREIGN PATENT DOCUMENTS

| | | |
|---|---|---|
| 54-059936 | 5/1979 | Japan . |
| 56-089594 | 7/1981 | Japan . |
| 59-078885 | 5/1984 | Japan . |
| 59-096987 | 6/1984 | Japan . |
| 60-220750 | 11/1985 | Japan . |
| 63-299971 | 12/1988 | Japan . |
| 1008086 | 1/1989 | Japan . |
| 03025352 | 4/1991 | Japan . |
| 03026665 | 4/1991 | Japan . |

*Primary Examiner*—Valerie Lund
*Attorney, Agent, or Firm*—Fitzpatrick, Cella, Harper & Scinto

[57] ABSTRACT

Disclosed herein is an ink-jet printing method by ejecting an ink from an orifice of a printing head in accordance with a printing signal to conduct printing on a printing material, comprising using an ink having a pH value ($pH_A$) at which the absorbance of the ink becomes a half of the absorbance at the pH in the stable region of the ink on an absorbance curve according to a pH change and a printing material comprising a base material and a coating layer provided thereon having a surface pH value of $pH_B$, with $pH_A$ and $pH_B$ satisfying the relationship $$pH_A < pH_B.$$

17 Claims, 3 Drawing Sheets

INK-JET PRINTING METHOD AND METHOD OF PRODUCING PRINT

BACKGROUND OF THE INVENTION

1. Field of the Invention

The present invention relates to an ink-jet printing method which is capable of reproducing a designed color of ink on a printing material and permits the provision of images high in quality, and a method of producing a print.

2. Related Background Art

An ink-jet printing method is a recording method in which recording is conducted by generating and flying droplets of an ink by one of various ink ejection systems, for example, an electrostatic attraction system, a system using a piezo-electric element to give an ink mechanical vibration or change, or a system in which an ink is heated to form bubbles in the ink, thereby using the pressure thus produced, and applying the droplets in whole or in part to a printing material such as paper or a plastic film coated with an ink-receiving layer. The ink-jet printing method attracts attention as a printing method Which scarcely produces noise and can conduct high-speed printing and color printing.

As inks for ink-jet printing, inks comprising water as a principal component are mainly used from the viewpoint of safety, recordability, etc. Polyhydric alcohols and/or the like are often added to such inks with a view toward preventing clogging of orifice and improving ejection stability.

Besides, water-soluble dyes represented by direct dyes, acid dyes, basic dyes, reactive dyes and food colors are used as dyes for the inks to be used. Further, dyes of the type that a carboxyl group is contained in their molecules have recently come to be used for the purpose of improving the water fastness of an image formed on a printing medium.

As recording materials suitable for use in ink-jet printing, there have hitherto been used printing paper as described in Japanese Patent Publication No. 3-26665, which comprises a base paper web and a coating layer provided thereon containing finely powdered silica and a water-soluble binder such as polyvinyl alcohol, glossy paper as described in Japanese Patent Publication No. 3-25352, which comprises a cast-coated paper web and a film formed thereon containing polyvinyl alcohol having a saponification degree of from 50 to 90 mole % and a crosslinking agent, and a recording sheet for an over-head projector (OHP) as described in Japanese Patent Application Laid-Open No. 60-220750, which comprises a polyester film and a hydrophilic film provided thereon composed of water-soluble polyvinyl alcohol having a saponification degree of from 70 to 90 mole %.

With the recent improvement in performance of ink-jet printing apparatus, such as speeding up of printing and multi-coloring of images, printing materials for ink-jet are also required to have higher and wider properties. More specifically, they are required to simultaneously satisfy, for example, the following properties:

(1) causing no color deviation from an inherent color of a dye and being able to achieve proper color mixing;
(2) having high ink absorptivity (absorbing capacity being great, and absorbing time being short);
(3) providing dots high in optical density and clear in periphery;
(4) providing dots having a substantially round shape and a smooth periphery;
(5) undergoing scarce changes in the properties even at varied temperatures and humidities and no curling;
(6) undergoing no blocking;
(7) being able to stably store images thereon for a long period of time without deteriorating them (in particular, in a high-temperature and high-humidity environment); and
(8) being stable without undergoing deterioration even when stored for a long period of time (in particular, in a high-temperature and high-humidity environment).

Besides, printing sheets for OHP, and the like are further required to have excellent transparency in addition to the above requirements.

As described above, the dyes of the type that a carboxyl group is contained in their molecules have recently come to be used as dyes for inks with a view toward improving the water fastness of an image formed on a printing material.

An ink prepared by using a dye of this type has an absorbance curve according to variation in pH as illustrated in FIG. 1. More specifically, the ink has a feature that when the pH of the ink is gradually lowered from a pH in a stable region of the ink, its absorbance is rapidly reduced. This is believed to be attributed to the rapid aggregation of the dye at a certain pH. Incidentally, the pH in a stable region of the ink is a pH at which the dye is fully dissolved in the ink and hence undergoes neither aggregation nor precipitation. Therefore, the aggregation of the dye may occur very quickly according to the pH ($pH_B$) of the surface of a printing material, which may offer such problems that a color deviation from an inherent color of the dye is caused, and proper color mixing cannot be achieved. In particular, printing materials such as a recording sheet for OHP, of which transparency is required, involve a serious problem attributable to strong aggregation of the dye therein that the printed area of such a printing material cannot transmit light due to haze development on its surface, in addition to the problems that a color deviation from an inherent color of the dye is caused, and proper color mixing cannot be achieved.

For example, Japanese Patent Application Laid-Open No. 56-89594 describes a method of suppressing a color deviation by adjusting a difference in pH between an ink and the surface of a printing sheet within 2. However, even the use of such a method cannot solve the problems that a color deviation from an inherent color of the dye is caused, and proper color mixing cannot be achieved if an ink-jet printing ink containing the dye capable of improving the water fastness of images formed is used. More specifically, the dye capable of improving the water fastness rapidly changes the absorbance of an ink containing it depending upon pH. Therefore, reference must be made to the dependence of absorbance of ink on pH.

With the progress of speeding up of printing, increasing of image density, coloring of images and imparting of good water fastness to images, as described above, reduction in color tone and image quality has become a serious problem.

SUMMARY OF THE INVENTION

It is an object of the present invention to provide an ink-jet printing method which satisfies the above-described properties at the same time in a well-balanced relation, and by which even when a dye capable of improving the water fastness of images formed as described above is used, a print causing no color deviation from an inherent color of the dye (a designed color for ink) can be provided, proper color mixing can be achieved, the light transmission properties of printed areas by ink-jet printing can be made excellent even if a transparent base material such as a film for OHP is used, and images bright and high in quality can be provided even if an opaque base material such as glossy paper is used, and a method of producing prints.

The above object can be achieved by the present invention described below.

According to the present invention, there is thus provided an ink-jet printing method by ejecting an ink from an orifice of a printing head in accordance with a printing signal to conduct printing on a printing material, comprising using an ink having a pH value ($pH_A$) at which the absorbance of the ink becomes a half of the absorbance at the pH in the stable region of the ink on an absorbance curve according to a pH change and a printing material comprising a base material and a coating layer provided thereon having a surface pH value of $pH_B$, and said $pH_A$ and $pH_B$ satisfying the relationship $$pH_A < pH_B.$$

According to the present invention, there is also provided a method of producing a print by ejecting an ink from an orifice of a printing head in accordance with a printing signal to conduct printing on a printing material, comprising using an ink having a pH value ($pH_A$) at which the absorbance of the ink becomes a half of the absorbance at the pH in the stable region of the ink on an absorbance curve according to a pH change and a printing material comprising a base material and a coating layer provided thereon having a surface pH value of $pH_B$, and said $pH_A$ and $pH_B$ satisfying the relationship $$pH_A < pH_B.$$

According to the present invention, there is further provided a print produced by the method described above.

In each of the above methods, the ink may contain a dye having at least one carboxyl group in its molecule, and the ejection of the ink may be conducted by thermal energy.

DESCRIPTION OF THE PREFERRED EMBODIMENTS

Figure 1:
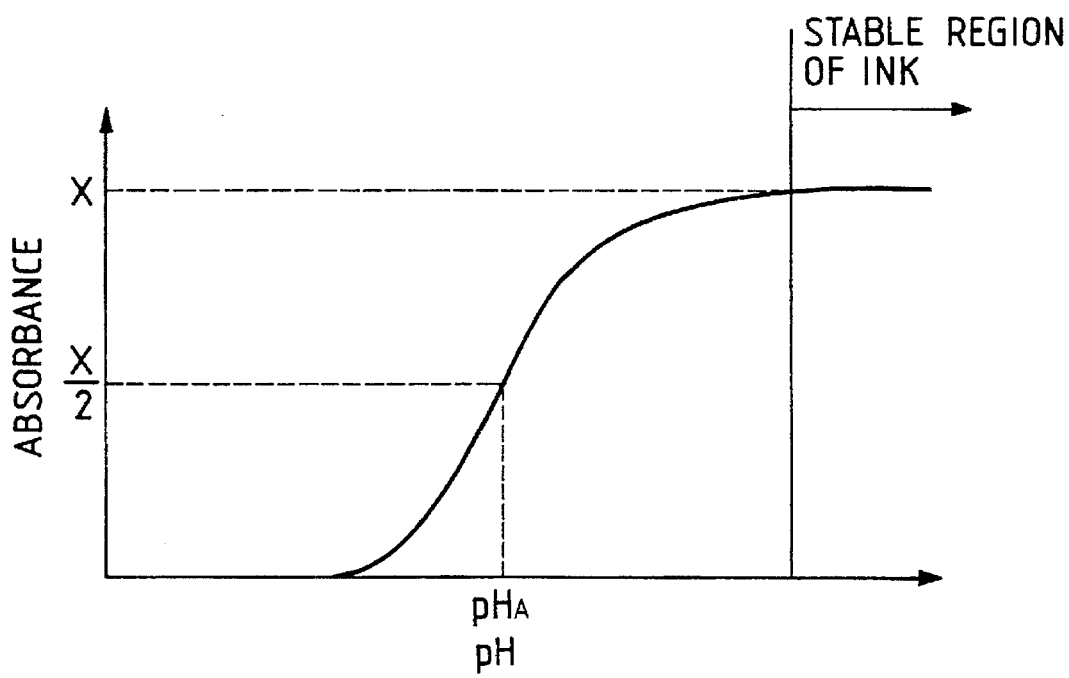
FIG. 1 illustrates a graph for determining the $pH_A$ of an ink.

The present inventors have found in the course of developing an ink-jet printing method, an ink, printing paper, a transparent film for over-head projectors and glossy paper, by which the water fastness of printed images is improved, that the combination of an ink containing a dye exhibiting good water fastness with a printing medium having a specific surface pH value permits the provision of a print causing no color deviation from an inherent color of the dye, the achievement of proper color mixing, and the provision of images excellent in light transmission properties at printed areas by ink-jet printing even if a transparent base material such as a film for OHP is used, and images bright and high in quality even if an opaque base material such as glossy paper is used, thus leading to completion of the present invention.

The present invention will hereinafter be described in more detail by reference to the preferred embodiments.

Inks useful in the practice of the present invention comprise a dye and a liquid medium dissolving or dispersing the dye therein.

Any dye may be used irrespective of its structure and has a satisfactory effect so far as the absorbance of an ink containing such a dye greatly varies according to pH values. However, the present invention exhibits a special effect upon the use of such dyes having at least one carboxyl group as mentioned below.

For purposes Of the control of solubility, and the like, the dye may contain a sulfonic group in addition to the carboxyl group in its molecule. As counter ions of the dye, ions of alkali metals such as sodium, potassium and lithium, ammonia, and organic amines such as monoethanolamine, diethanolamine and triethanolamine are preferred. These may be used either singly or in any combination thereof. Preferable examples of such dyes are mentioned below. However, the dyes used in the present invention are not limited to these dyes.

(Exemplified Dye No.1) Orange:

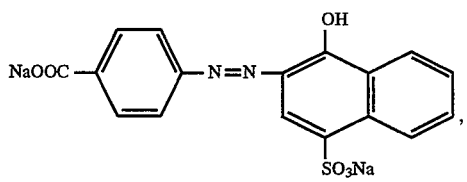

(Exemplified Dye No.2) Magenta:

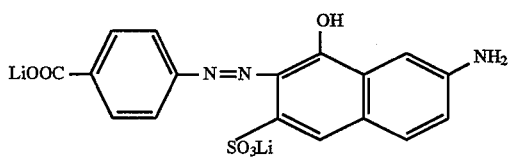

(Exemplified Dye No.3) Violet:

-continued

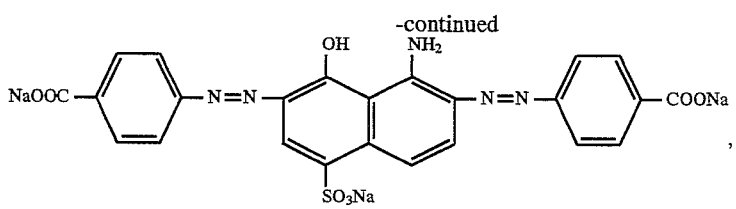

(Exemplified Dye No.4) Yellow:

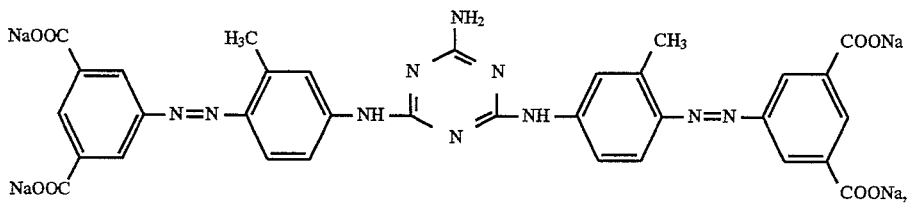

(Exemplified Dye No.5) Cyan:

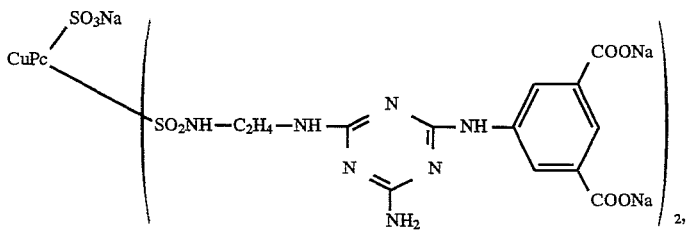

CuPc: copper phthalocyanine (Exemplified Dye No.6) Black:

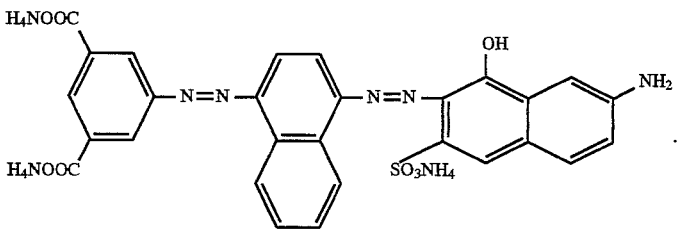

The above-mentioned dyes used in the ink-jet printing method according to the present invention are used in a proportion ranging from about 0.1 to 20% by weight based on the total weight of an ink.

A liquid medium suitable for use in the inks used in the present invention is a mixed solvent of water and at least one water-soluble organic solvent. As the water, it is preferable to use deionized water instead of tap water containing various ions.

As examples of the water-soluble organic solvent used in combination with water, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 2-pyrrolidone; 1,3-dimethyl-2-imidazolidinone; and the like.

Among of these many water-soluble organic solvents, polyhydric alcohols such as diethylene glycol and lower alkyl ethers of polyhydric alcohols, such as triethylene glycol monomethyl (or monoethyl) ether are preferred.

In order to achieve good ejection stability, it is effective to further add ethanol or isopropyl alcohol, or a lower alkyl ether of a polyhydric alcohol because the addition of these solvents is considered to permit more stable bubbling of the resulting ink on a thin film resistor.

The content of the water-soluble organic solvents in the inks used in the present invention is within a range of from 3 to 50% by weight, preferably from 3 to 40% by weight based on the total weight of the ink, while the content of water used is within a range of from 10 to 95% by weight, preferably from 20 to 85% by weight based on the total weight of the ink.

Further, the inks used in the present invention may contain, in addition to the above components, surfactants, antifoaming agents, antiseptics and the like as needed to provide them as inks having desired physical properties. Commercially-available water-soluble dyes and/or the like may also be added thereto.

No particular limitation is imposed on the surfactants added so long as they do not adversely affect the storage stability and the like of the inks. Examples of such surfactants used include anionic surfactants such as fatty acid salts, salts of higher alcohol sulfates, salts of sulfuric esters of liquid fatty oils and alkylallylsulfonates; and nonionic surfactants such as polyoxyethylene alkyl ethers, polyoxyethylene alkyl esters, polyoxyethylene sorbitan alkyl esters, acetylene alcohols and acetylene glycols. These surfactants may be suitably chosen for either Single use or combined use.

In the case where pH adjustment is required for keeping the stability of the ink, examples of a pH adjustor used include ammonia, various kinds of organic amines such as diethanolamine and triethanolamine, inorganic alkalis such as the hydroxides of alkali metals, for example, sodium hydroxide, lithium hydroxide and potassium hydroxide, organic acids, and inorganic acids.

The $pH_A$ of the ink thus prepared and used in the present invention is determined in the following manner.

An inorganic or organic acid such as hydrochloric acid or acetic acid is gradually added to an ink the pH of which is in a stable region of the initial state, thereby gradually lowering the pH of the ink. During this process, the ink is centrifuged upon Occasion to measure the absorbance of the resultant supernatant liquid, thereby plotting its value against pH values. From the graph thus prepared, the $pH_A$ at which the absorbance of the ink becomes a half of the value in the stable region can be determined with ease.

In the case where multi-color printing is conducted, the $pH_A$ of an ink which shows the highest $pH_A$ among the individual color inks is taken as $pH_A$ according to the present invention.

A printing material used in the present invention comprises a base material and an ink-receiving layer provided on the base material. As a component used in the ink-receiving layer, there may be used a resin which can receive a water-based ink and shows solubility in or affinity for the water-based ink.

As exemplary materials making up the ink-receiving layer, there may be mentioned synthetic resins such as polyvinyl alcohol, polyvinyl acetal, polyvinyl pyrrolidone, polyurethane, carboxymethylcellulose, polyester, polyacrylic acid (esters), hydroxyethylcellulose, hydroxypropylcellulose, melamine resins, and modified products thereof; and natural resins such as albumin, gelatin, casein, starch, cationic starch, gum arabic and sodium alginate. These resins may be used either singly or in any combination thereof.

In order to satisfy the above relationship between the pHs, it is preferable to select the resin used and/or to mix various kinds of cationic and anionic activators, various kinds of cationic and anionic polymers or oligomers, and various kinds of pH adjustors with the resin.

For example, no particular limitation is imposed on the anionic compounds used in combination with the resin so far as they contain an anionic moiety in their molecules. Examples of anionic surfactants include alkylbenzenesulfonates, salts of alkylsulfuric esters, alkylnaphthalenesulfonates, alkylphosphates, alkylsulfosuccinates, naphthalenesulfonic acid-formalin condensates and salts of polyoxyethylene alkylphosphates. Besides, amphoteric surfactants such as alkylbetaines, imidazolinium betaines and alanine derivatives, which contain an anionic moiety, may be used.

As the anionic polymers or oligomers, mention may be made of those having at least one sulfonic group, carboxyl group, sulfate group, phosphate group, phenolic hydroxyl group, alcoholic hydroxyl group or the like in their molecules. Examples of such polymers or oligomers suitable for use in the present invention include carboxyl group-terminated polyesters obtained by reacting a polycarboxylic acid with a polyhydric alcohol, acid cellulose derivatives obtained by modifying with various kinds of polycarboxylic acids, homopolymers of vinyl ether polycarboxylate monomers or their copolymers with other common monomers, homopolymers of (meth)acrylic acid or their copolymers with other common monomers, homopolymers of $\alpha,\beta$-unsaturated vinyl monomers such as maleic anhydride and itaconic acid or their copolymer with other common monomers, sulfonic acid-modified polymers obtained by treating polyvinyl alcohol or vinyl alcohol copolymers with a sulfonic compound, and hydroxyl group-containing compounds such as ethylcellulose, benzylcellulose, hydroxyethylcellulose and hydroxypropylcellulose. Besides the above compounds, any compound may be used so far as it has at least one sulfonic group, carboxyl group, sulfate group, phosphate group, phenolic hydroxyl group, alcoholic hydroxyl group or the like.

On the other hand, no particular limitation is imposed on the cationic compounds so far as they contain a cationic moiety in their molecules. Examples of cationic surfactants include cationic surfactants of the quaternary ammonium salt type, such as monoalkylammonium chlorides, dialkylammonium chlorides, tetramethylammonium chloride, trimethylphenylammonium chloride and ethylene oxide-added ammonium chlorides and cationic surfactants of the amine type. Besides, amphoteric surfactants such as alkylbetaines, imidazolinium betaines and alanine derivatives, which contain such a cationic moiety as described above, may be used.

As the cationic polymers or oligomers, may be mentioned cationically modified products of polyacrylamide or copolymers of acrylamide and a cationic monomer, polyallylamine, polyamine sulfone, polyvinylamine, polyethyleneimine, polyamide-epichlorohydrin resins, polyvinylpyridinium halides, etc. Besides, homopolymers of vinylpyrrolidone monomers or their copolymers with other common monomers, homopolymers of vinyloxazolidone monomers or their copolymers with other common monomers, homopolymers of vinylimidazole monomers or their copolymers with other common monomers, etc. may be mentioned. The common monomers include methacrylates, acrylates, acrylonitrile, Vinyl ethers, vinyl acetate, ethylene, styrene and the like. Further, cationically modified polyvinyl alcohol and cellulose may be used. It goes without saying that the cationic polymers or oligomers are not limited to these compounds.

Furthermore, the pH adjustors include those mentioned above, for example, ammonia, various kinds of organic amines such as diethanolamine and triethanolamine, inorganic alkalis such as the hydroxides of alkali metals, for example, sodium hydroxide, lithium hydroxide and potassium hydroxide, organic acids, and inorganic acids. More than one of these compounds of various types may be used at the same time.

In the present invention, the composition satisfying the above conditions is coated on at least one side of a base material to prepare a printing medium comprising the base material and an ink-receiving layer provided on the surface of the base material. In this composition, various kinds of fillers may be used in combination as an additive within limits not impeding the achievement of the object of the present invention.

Examples of the fillers include silica, alumina, aluminum silicate, magnesium silicate, basic magnesium carbonate, talc, clay, hydrotalcite, calcium carbonate, titanium oxide, zinc oxide, and plastic pigments such as polyethylene, polystyrene and polyacrylates. However, the fillers are not limited to these fillers. As specific examples of further additives, mention may be made of various kinds of surfactants, dye-fixing agents, antifoaming agents, antioxidants, optical whitening agents, ultraviolet absorbents, dispersants, viscosity modifiers, mildewproofing agents, and plasticizers. These additives may be optionally selected from the conventionally known compounds as necessary for the end application intended.

As the base material constituting the printing material used in the present invention, there may be used a paper web such as wood free paper, medium-quality paper, art paper, bond paper, recycled paper, baryta paper, cast-coated paper or corrugated fiberboard, a film or sheet of a plastic such as polyethylene terephthalate, diacetate, triacetate, cellophane, celluloid, polycarbonate, polyimide, polyvinyl chloride, polyvinylidene chloride, polyacrylate, polyethylene or polypropylene, a glass plate, or a fabric such as cotton, rayon, acrylic, nylon, silk or polyester. The base material is suitably selected from the above-mentioned materials according to various conditions such as the intended printing application of the resulting printing material, the use of printed images and the adhesiveness to a composition to be coated thereon.

Upon the preparation of the printing material used in the present invention, the above-described composition is first of all dissolved or dispersed, together with other additives if necessary, in water or an alcohol, polyhydric alcohol or another suitable organic solvent to prepare a coating formulation.

The resulting coating formulation is applied to the surface of the base material by, for example, a roll coater, blade coater, air knife coater, gate roll coater, bar coater, size pressing, spray coating, gravure coater or curtain coater method. Thereafter, the thus-coated base material is dried using, for example, a hot-air drying oven, heating drum or the like, thereby obtaining a printing material used in the present invention. As needed, the resulting printing material may be further subjected to supercalendering or the like so as to increase the smoothness or surface strength of the ink-receiving layer.

The coat weight of the ink-receiving layer is within a range of from 0.2 to 50 g/m$^2$, more preferably from 1 to 30 g/m$^2$ in total. If the coat weight is made small, a part of the base material may be exposed without coating. Any coat weights less than 0.2 g/m$^2$ have little effect in respect of coloring ability of coating compared with the case where no ink-receiving layer is provided. If the coat weight of the ink-receiving layer provided exceeds 50 g/m$^2$ on the other hand, curling may occur, particularly, in a low-temperature and low-humidity environment. It is hence not preferable to provide the ink-receiving layer in any coat weight outside the above range. The coat weight may preferably be within a range of from 0.5 to 100 µm in terms of thickness.

A preferred method of conducting printing by applying the above-described ink to the printing material is an ink-jet printing method. As such a method, any system may be used so far as it can effectively eject an ink out of a nozzle to apply the ink to the printing material as a target.

In particular, an ink-jet printing system described in Japanese Patent Application Laid-Open No. 54-59936, in which an ink undergoes a rapid volumetric change by an action of thermal energy applied to the ink, so that the ink is ejected out of an orifice by the working force generated by this change of state, may be used effectively.

Figure 2:
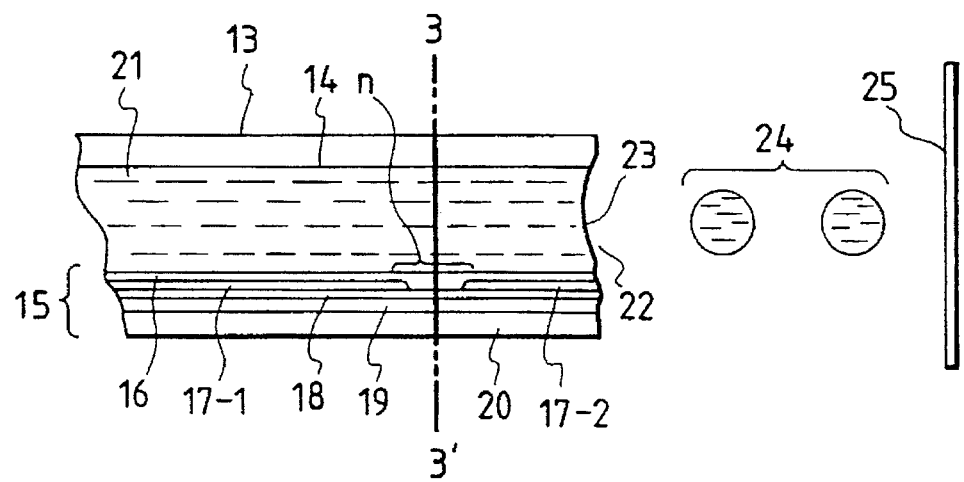
FIG. 2 is a longitudinal cross section of a head of an ink-jet printing apparatus.
Figure 3:
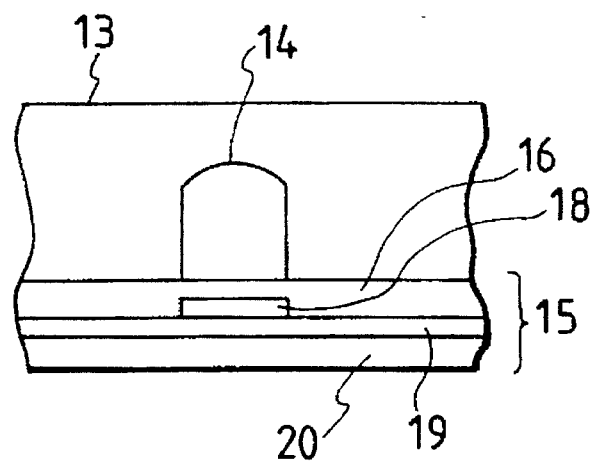
FIG. 3 is a transverse cross section of the head of the ink-jet printing apparatus.
Figure 4:
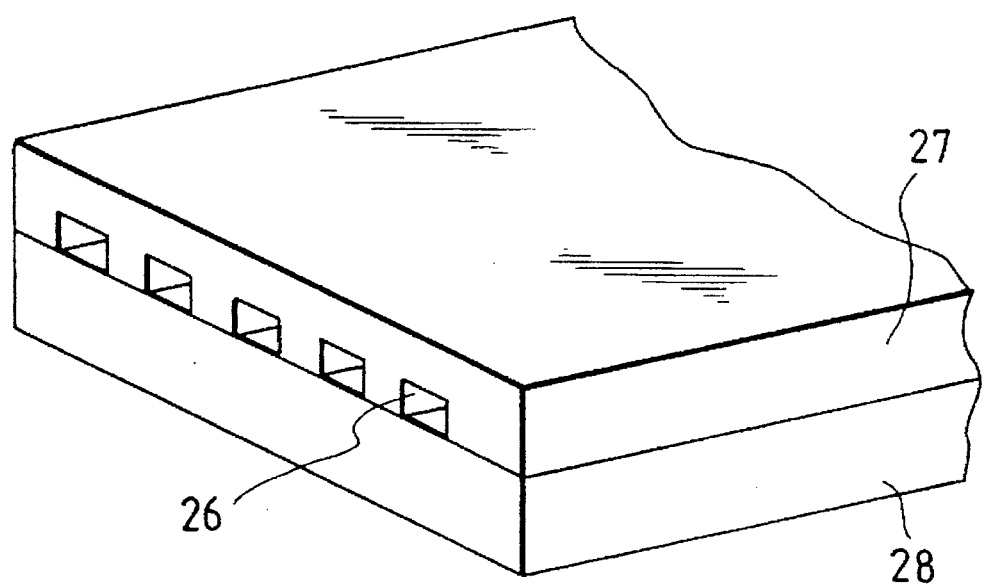
FIG. 4 is a perspective view of the appearance of a multi-nozzle head which is an array of the nozzles of such heads as shown in FIG. 2.

An illustrative example of an ink-jet printing apparatus, which is suitable for use in conducting printing using the printing material used in the present invention, will hereinafter be described. Examples of the construction of a head, which is a main component of such an apparatus, are illustrated in FIGS. 2, 3 and 4.

A head 13 is formed by bonding a glass, ceramic or plastic plate or the like having a groove 14 through which an ink is passed, to a heating board 15, which is used for thermal recording to form a nozzle. (The drawing shows a head to which the present invention, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 is filled to an ejection orifice (a minute opening) 22 and forms a meniscus 23 owing to a pressure P.

Now, upon application of electric signals to the electrodes 17-1, 17-2, the heating board 15 rapidly generates heat at the region shown by n to form bubbles in the ink 21 which is in contact with this region. The meniscus 23 of the ink is projected by the action of the pressure thus produced, and the ink 21 is ejected from the orifice 22 to a printing material 25 in the form of recording droplets 24. FIG. 4 illustrates an appearance of a multi-nozzle head composed of an array of a number of nozzles as shown in FIG. 2. The multi-nozzle head is formed by closely bonding a glass plate 27 having a number of grooves 26 to a heating head 28 similar to the head as illustrated in FIG. 2.

Incidentally, FIG. 2 is a cross-sectional view of the head 13 taken along the flow path of the ink, and FIG. 3 is a cross-sectional view taken along line 3—3' in FIG. 2.

Figure 5:
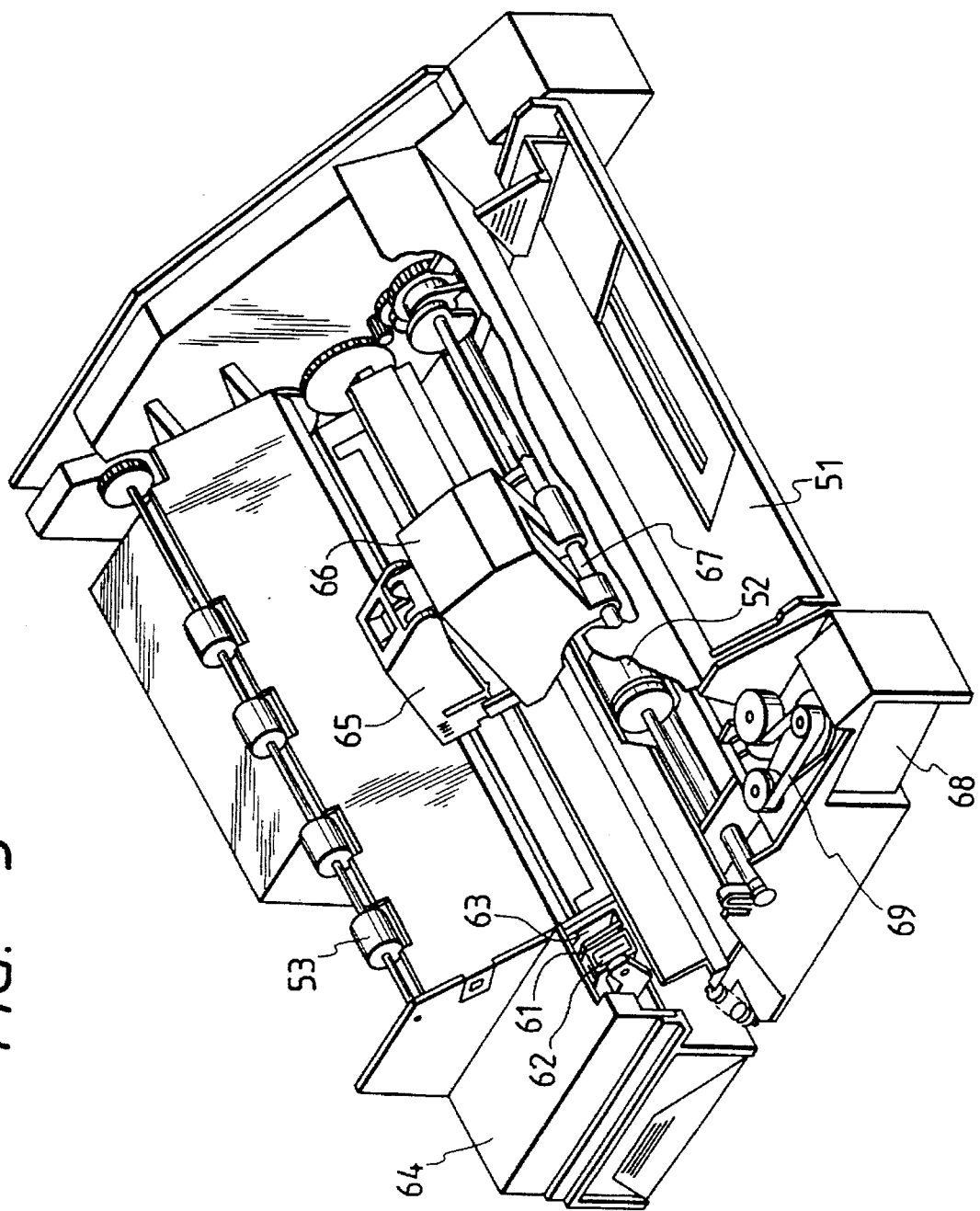
FIG. 5 is a perspective view of an illustrative ink-jet printing apparatus.

FIG. 5 illustrates an example of an ink-jet printing apparatus in which such a head has been incorporated. In FIG. 5, reference numeral 61 designates a blade serving as a wiping member, one end of which is a stationary end held by a blade-holding member to form a cantilever. The blade 61 is provided at the position adjacent to the region in which a printing head operates, and in this embodiment, is held in such a form that it protrudes to the course through which the printing head is moved. Reference numeral 62 indicates a cap, which is provided at the home position adjacent to the blade 61, and is so constituted that it moves in the direction perpendicular to the direction in which the printing head is moved and comes into contact with the face of ejection openings to cap it. Reference numeral 63 denotes an ink-absorbing member provided adjoiningly to the blade 61 and, similar to the blade 61, held in such a form that it protrudes to the course through which the printing head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the printing head having an ejection-energy-generating means and serving to eject the ink onto a printing material set in an opposing relation with the ejection opening face provided with ejection openings to conduct printing. Reference numeral 66 indicates a carriage on which the printing head 65 is mounted so that the printing head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the printing head 65 can be moved from a printing region to a region adjacent thereto.

Reference numerals 51 and 52 denote a paper feeding part from which the printing materials are separately inserted, and paper feed rollers driven by a motor (not illustrated), respectively. With such construction, the printing material is fed to the position opposite to the ejection opening face of the printing head, and discharged from a paper discharge section provided with paper discharge rollers 53 with the progress of printing.

In the above constitution, the cap 62 in the head recovery portion 64 is retracted from the moving course of the printing head 65 when the printing head 65 is returned to its home position, for example, after completion of printing, and the blade 61 remains protruded to the moving course. As a result, the ejection opening face of the printing head 65 is wiped. When the cap 62 comes into contact with the ejection opening face of the printing head 65 to cap it, the cap 62 is moved so as to protrude to the moving course of the printing head.

When the printing head 65 is moved from its home position to the position at which printing is started, the cap 62 and the blade 61 are at the same positions as the positions upon the wiping as described above. As a result, the ejection opening face of the printing head 65 is also wiped at the time of this movement.

The above movement of the printing head to its home position is made not only when the printing is completed or the printing head is recovered for ejection, but also when the printing head is moved between printing regions for the purpose of printing, during which it is moved to the home position adjacent to each printing region at given intervals, where the ejection opening face is wiped in accordance with this movement.

The present invention will hereinafter be described more specifically by the following examples. Incidentally, all designations of "part" or "parts" and "%" as will be used in the following examples mean part or parts by weight and % by weight unless expressly noted.

EXAMPLES 1 TO 4 AND COMPARATIVE EXAMPLES 1 AND 2

| Ink 1 (Orange) | |
|---|---|
| Exemplified Dye No. (1) | 3 parts |
| Thiodiglycol | 10 parts |
| Urea | 5 parts |
| Water | 82 parts |
| This ink had a $pH_A$ Of 8.0. | |

As described above, the $pH_A$ was determined by gradually adding hydrochloric acid to the ink the pH value of which was in a stable region of the initial state, thereby gradually lowering the pH value of the ink, and centrifuging the ink upon occasion to measure the absorbance of the resultant supernatant liquid, thereby plotting its Value against pH values.

(Preparation of coating formulation, coating and printing)

While stirring and mixing, mixtures of (i) polyvinyl alcohol (trade name: PVA217, manufactured by Kuraray Co., Ltd.) and (ii) polyethyleneimine (trade name: Epomine SP-200, manufactured by Nippon Shokubai Kagaku Kogyo Co., Ltd.) were separately added to a mixture of 97 parts of water and 3 parts of methanol into solutions. The proportions (mixing ratios in terms of solids) of (i) to (ii) used in these examples and comparative examples are shown in Table 1. The thus-obtained coating formulations were separately coated on a polyethylene terephthalate film (Lumirror, product of Toray Industries, Inc., thickness: 100 µm) using a wire bar to give a dry coat thickness of 10 µm. The films thus coated were then dried at 120° C. for 5 minutes to prepare recording media to be used in the present invention and Comparative Examples. The surface pH value ($pH_B$) of each of the ink-receiving layers thus formed was measured by means of a pH meter for measurement of paper surface (manufactured by Kyoritsu Rikagaku Kenkyusho). These $pH_B$ values are also shown collectively in Table 1.

TABLE 1

| | Proportion used | | |
|---|---|---|---|
| | (i) | (ii) | Surface $pH_B$ |
| Ex. 1 | 99.5 | 0.5 | 8.7 |
| Ex. 2 | 98 | 2 | 9.3 |
| Ex. 3 | 90 | 10 | 10.9 |
| Ex. 4 | 80 | 20 | 11.3 |
| Comp. Ex. 1 | 100 | 0 | 6.8 |
| Comp. Ex. 2 | 99.8 | 0.2 | 7.9 |

Using Ink 1 having the above-described composition, printing was conducted on the printing materials thus obtained under the following conditions by means of an ink-jet printing apparatus in which an ink is ejected by bubbling of the ink by thermal energy.

Printing conditions:

| | |
|---|---|
| Driving frequency: | 4 kHz |
| Volume of ejection droplet: | 45 pl |
| Recording density: | 360 DPI |
| Maximum application volume of a single color ink: | 8 nl/mm$^2$. |

With respect to the resulting color print samples, the following properties were evaluated.

(Items evaluated)

(1) Image density:

Solid printing (200% duty) was conducted with a black (Bk) ink by means of the printer described above. The image density of the print thus obtained was determined by means of a Macbeth densitometer RD-918.

(2) Image irregularity:

With respect to a print obtained by solid printing by means of the printer described above, the image irregularity was evaluated and ranked as A where no unevenness of color strength was recognized, C where unevenness of color strength was visually recognized even when observing the print 50 cm apart from the eyes, or B where it was in-between thereof.

(3) Color tone of image and light transmittance:

A print prepared in the above-described manner was projected by a transmission type over-head projector to evaluate it in color tone of image and light transmittance and rank as C where the color tone of the printed area markedly changed, or the projected image became dark, B where the color tone slightly changed, or the projected image became somewhat dark, or A where no problem was visible.

The evaluation results are shown collectively in Table 3.

EXAMPLE 5

Printing was conducted by means of the ink-jet printing apparatus, in which an ink is ejected by bubbling of the ink by thermal energy, in the same manner as in Example 1 except that Ink 2 having the following composition was used in place of Ink 1 in Example 1. The evaluation results as to the print thus obtained are shown in Table 3.

| Ink 2 (Violet) | |
|---|---|
| Exemplified Dye No. (3) | 2.5 parts |
| 2-Pyrrolidone | 10.5 parts |
| Ethyl alcohol | 5 parts |
| Water | 82 parts |
| This ink had a $pH_A$ of 7.5. | |

This ink had a $pH_A$ of 7.5.

EXAMPLES 6 TO 9 AND COMPARATIVE EXAMPLES 3 AND 4

Using Inks 3 to 6 of 4 different colors of cyan, magenta, yellow and black, which had the following respective compositions, color printing was conducted in the same manner as in Example 1 on printing materials prepared in accordance with the following formulation and shown in Table 2. The evaluation results are shown in Table 3.

| Ink 3 (Cyan) | |
|---|---|
| Exemplified Dye No. (5) | 2 parts |
| Thiodiglycol | 16 parts |
| Ethylene glycol | 4 parts |
| Water | 78 parts |
| This ink had a $pH_A$ of 6.5. | |
| Ink 4 (Magenta) | |
| Exemplified Dye No. (2) | 2 parts |
| Diethylene glycol | 15 parts |
| Isopropyl alcohol | 3 parts |
| Glycerol | 5 parts |
| Water | 75 parts |
| This ink had a $pH_A$ of 8.0. | |
| Ink 5 (Yellow) | |
| Exemplified Dye No. (4) | 3 parts |
| Polyethylene glycol (average molecular weight: 300) | 5 parts |
| Ethylene glycol | 10 parts |
| Isopropyl alcohol | 3 parts |
| Water | 79 parts |
| This ink had a $pH_A$ of 7.2. | |
| Ink 6 (Black) | |
| Exemplified Dye No. (6) | 3 parts |
| Ethylene glycol | 8 parts |
| Ethyl alcohol | 5 parts |
| Glycerol | 5 parts |
| Water | 79 parts |
| This ink had a $pH_A$ of 7.0. | |

This ink had a $PH_A$ of 7.0.
(Preparation of coating formulation, coating and printing)

While stirring and mixing, mixtures of (i) polyvinyl acetal (trade name: Eslec KW-1, maker: Sekisui Chemical Co., Ltd.) and (ii) polyallylamine (trade name: PAA-10C, maker: Nitto Boseki Co., Ltd.) were separately added to a mixture of 95 parts of water and 5 parts of ethylene glycol into solutions. The proportions (mixing ratios in terms of solids) of (i) to (ii) used in these examples and comparative examples are shown in Table 2. The thus obtained coating formulations were separately coated on a polyethylene terephthalate film (Lumirror, product of Toray Industries, Inc., thickness: 100 μm) using a wire bar to give a dry coat thickness of 15 μm. The films thus coated were then dried at 120° C. for 5 minutes to prepare recording materials to be used in the present invention and Comparative Examples. The surface pH value ($pH_B$) of each of the ink-receiving layers thus formed was measured by means of a pH meter for measurement of paper surface (manufactured by Kyoritsu Rikagaku Kenkyusho). These $pH_B$ values are also shown collectively in Table 2.

TABLE 2

| | Proportion used | | |
|---|---|---|---|
| | (i) | (ii) | Surface $pH_B$ |
| Ex. 6 | 99 | 1 | 8.2 |
| Ex. 7 | 98 | 2 | 9.3 |
| Ex. 8 | 90 | 10 | 10.4 |
| Ex. 9 | 80 | 20 | 10.8 |
| Comp. Ex. 3 | 100 | 0 | 5.7 |
| Comp. Ex. 4 | 99.5 | 0.5 | 7.6 |

EXAMPLES 10 AND 11

Recording materials were prepared in the same manner as in Example 6 except that art paper and wood free paper webs were respectively used as base materials. Recording was conducted on the recording materials thus prepared in the same manner as in Example 6. The evaluation results are shown in Table 3.

TABLE 3

| | Item evaluated | | |
|---|---|---|---|
| | Image density | Image irregularity | Color tone of image and light transmittance |
| Ex. 1 | — | A | A |
| Ex. 2 | — | A | A |
| Ex. 3 | — | A | A |
| Ex. 4 | — | A | A |
| Ex. 5 | — | A | A |
| Ex. 6 | 1.59 | A | A |
| Ex. 7 | 1.58 | A | A |
| Ex. 8 | 1.55 | A | A |
| Ex. 9 | 1.51 | A | A |
| Ex. 10 | — | A | A (Evaluated only in color tone) |
| Ex. 11 | — | A | A (Evaluated only in color tone) |
| Comp. Ex. 1 | — | B | C |
| Comp. Ex. 2 | — | B | C |
| Comp. Ex. 3 | 1.3 | B | C |
| Comp. Ex. 4 | 1.49 | A | C |

According to the present invention, as described above, there can be provided an ink-jet printing method by which even when a dye of the type that at least one carboxyl group is contained in its molecule is used as a dye capable of improving the water fastness of images formed, a print having a color tone identical with that inherent in the dye can be provided, proper color mixing can be achieved, and the light transmission properties of printed areas by ink-jet printing can be made excellent even if a transparent base material such as a film for OHP is used.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink-jet printing method comprising the steps of:

providing an ink having a pH value ($pH_A$) at which absorbance of the ink is one-half of the absorbance at the pH in a stable absorbance region of the ink on an absorbance curve according to a pH change, the stable absorbance region being a region in Which absorbance substantially is Saturated and does not vary With the pH change;

providing a transparent printing material comprising a base material and a coating layer provided thereon having a surface pH value of $pH_B$; and ejecting the ink from an orifice of a printing head in accordance with a printing signal to conduct printing on the transparent printing material, wherein $pH_A$ and $pH_B$ satisfy the relationship $$pH_A < pH_B$$

and the ink contains a dye with each molecule having at least one carboxyl group.

2. The ink-jet printing method according to claim 1, wherein the dye further contains a sulfonic group.

3. The ink-jet printing method according to claim 1, wherein each molecule the dye contains 1 to 4 carboxyl groups.

4. The ink-jet printing method according to claim 3, wherein each molecule of the dye contains 1 to 4 carboxyl groups and a sulfonic group.

5. The ink-jet printing method according to claim 1, wherein the base material of the printing material comprises a plastic film.

6. The ink-jet printing method according to claim 1, wherein the said step of ejecting the ink comprises applying thermal energy to the ink.

7. The ink-jet printing method according to claim 1, wherein the coating layer of the printing material comprises at least one of a synthetic resin and a natural resin.

8. The ink-jet printing method according to claim 7, wherein the resin is selected from the group consisting of polyvinyl alcohol, polyvinyl acetal, polyvinyl pyrrolidone, polyurethane, carboxymethylcellulose, polyester, polyacrylic acid and esters thereof, hydroxyethylcellulose, hydroxypropylcellulose, melamine resins and modified products thereof, albumin, gelatin, casein, starch, cationic starch, gum arabic and sodium alginate.

9. A method of producing a print comprising the steps of:

providing an ink having a pH value ($pH_A$) at which absorbance of the ink is one-half of the absorbance at the pH in a stable absorbance region of the ink on an absorbance curve according to a pH change, the stable absorbance region being a region in which absorbance substantially is saturated and does not vary with the pH change;

providing a transparent printing material comprising a base material and a coating layer provided thereon having a surface pH value of $pH_B$; and ejecting the ink from an orifice of a printing head in accordance with a printing signal to conduct printing on the transparent printing material, wherein $pH_A$ and $pH_B$ satisfy the relationship $$pH_A < pH_B$$

and the ink contains a dye with each molecule having at least one carboxyl group.

10. The method according to claim 9, wherein the dye further contains a sulfonic group.

11. The method according to claim 9, wherein each molecule of the dye contains 1 to 4 carboxyl groups.

12. The method according to claim 11, wherein each molecule of the dye contains 1to 4 carboxyl groups and a sulfonic group.

13. The method according to claim 9, wherein the base material of the printing material comprises a plastic film.

14. The method according to claim 9, wherein said step of ejecting the ink comprises applying thermal energy to the ink.

15. A print produced by the method according to any one of claims 9 to 14.

16. The method according to claim 9, wherein the coating layer of the printing material comprises one of a synthetic resin and a natural resin.

17. The method according to claim 16, wherein the resin is selected from the group consisting of polyvinyl alcohol, polyvinyl acetal, polyvinyl pyrrolidone, polyurethane, carboxymethylcellulose, polyester, polyacrylic acid and esters thereof, hydroxyethylcellulose, hydroxypropylcellulose, melamine resins and modified products thereof, albumin, gelatin, casein, starch, cationic starch, gum arabic and sodium alginate.

* * * * *

UNITED STATES PATENT AND TRADEMARK OFFICE
CERTIFICATE OF CORRECTION

| | | |
|---|---|---|
| PATENT NO. : | 5,661,511 | Page 1 of 3 |
| DATED : | August 26, 1997 | |
| INVENTOR(S) : | Akio KASHIWAZAKI, et al. | |

It is certified that error appears in the above-indentified patent and that said Letters Patent is hereby corrected as shown below:

ON THE COVER PAGE:

AT [56] References Cited - FOREIGN PATENT DOCUMENTS:

"1008086   1/1989   Japan 03025352   4/1991   Japan 03026665   4/1991   Japan"

should read

--1-8086   1/1989   Japan 3-25352   4/1991   Japan 3-26665   4/1991   Japan--.

COLUMN 1:

Line 22, "Which" should read --which--.

COLUMN 4:

Line 36, "Of" should read --of--.

UNITED STATES PATENT AND TRADEMARK OFFICE
CERTIFICATE OF CORRECTION

PATENT NO. : 5,661,511            Page 2 of 3
DATED : August 26, 1997
INVENTOR(S) : Akio KASHIWAZAKI, et al.

It is certified that error appears in the above-indentified patent and that said Letters Patent is hereby corrected as shown below:

COLUMN 7:

Line 9, "Single" should read --single--;

Line 24, "Occasion" should read --occasion--.

COLUMN 8:

Line 45, "Vinyl" should read --vinyl--.

COLUMN 10:

Line 12, "head" should read --board--.

COLUMN 11:

Line 56, "Value" should read --value--.

COLUMN 15:

Line 7, "Which" should read --which--;

Line 8, "Saturated" should read --saturated--, and "With" should read --with--;

Line 26, "molecule" should read --molecule of--;

Line 35, "the" (first occurrence) should be deleted.

UNITED STATES PATENT AND TRADEMARK OFFICE
CERTIFICATE OF CORRECTION

| | | |
|---|---|---|
| PATENT NO. : | 5,661,511 | Page 3 of 3 |
| DATED : | August 26, 1997 | |
| INVENTOR(S) : | Akio KASHIWAZAKI, et al. | |

It is certified that error appears in the above-indentified patent and that said Letters Patent is hereby corrected as shown below:

<u>COLUMN 16</u>:

Line 25, "claim 11," should read --claim 9,--;

Line 26, "1to 4" should read --1 to 4--.

Signed and Sealed this

Ninth Day of June, 1998

BRUCE LEHMAN

Attest:

Attesting Officer

Commissioner of Patents and Trademarks